(12) United States Patent
Freeman et al.

(10) Patent No.: US 7,831,210 B1
(45) Date of Patent: Nov. 9, 2010

(54) MEMS-BASED BROADBAND TRANSCEIVER/SENSOR

(75) Inventors: Richard A. Freeman, Cedar Rapids, IA (US); Robert A. Newgard, Central City, IA (US); David A. Gribble, Cedar Rapids, IA (US); Manas K. Roy, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 930 days.

(21) Appl. No.: 11/607,610

(22) Filed: Dec. 1, 2006

(51) Int. Cl.
*H04B 1/38* (2006.01)

(52) U.S. Cl. .............. 455/73; 455/67.11; 455/63.3; 455/88; 333/133

(58) Field of Classification Search .............. 455/73, 455/67.11, 63.3, 88, 127.4, 144, 168.1; 333/133, 333/134
See application file for complete search history.

(56) References Cited

U.S. PATENT DOCUMENTS

| | | | | |
|---|---|---|---|---|
| 4,109,202 A * | 8/1978 | Kudsia et al. | ................ | 455/17 |
| 5,247,700 A * | 9/1993 | Wohl et al. | ................ | 455/552.1 |
| 5,864,265 A * | 1/1999 | Ballance et al. | ............. | 333/206 |
| 5,864,672 A * | 1/1999 | Bodeep et al. | ............... | 725/126 |
| 6,346,912 B1 * | 2/2002 | Reinhart et al. | ............. | 342/385 |
| 6,671,519 B2 * | 12/2003 | Jeon et al. | .................. | 455/522 |
| 6,674,967 B2 * | 1/2004 | Skrobko et al. | ............... | 398/72 |
| 6,801,767 B1 * | 10/2004 | Schwartz et al. | ......... | 455/426.2 |
| 6,885,336 B2 * | 4/2005 | Forrester | ................. | 342/357.1 |
| 7,075,412 B1 * | 7/2006 | Reynolds et al. | ........... | 340/10.2 |
| 7,098,862 B2 * | 8/2006 | Regala | ....................... | 343/850 |
| 7,239,853 B2 * | 7/2007 | Kearns | ......................... | 455/83 |
| 7,263,072 B2 * | 8/2007 | Martinez | ..................... | 370/276 |
| 7,307,494 B2 * | 12/2007 | Erb | ............................ | 333/126 |
| 7,376,446 B2 * | 5/2008 | Licht | ........................... | 455/561 |
| 7,388,435 B2 * | 6/2008 | Neenan et al. | ............... | 330/308 |
| 7,397,324 B2 * | 7/2008 | Tang et al. | ................... | 333/126 |
| 7,420,438 B2 * | 9/2008 | Nakai et al. | .................. | 333/133 |
| 7,447,439 B2 * | 11/2008 | O'Donnell et al. | .......... | 398/138 |
| 7,466,990 B2 * | 12/2008 | Mellor et al. | ............... | 455/523 |
| 7,495,528 B2 * | 2/2009 | Fukunaga | .................... | 333/132 |
| 7,564,420 B2 * | 7/2009 | Jeon et al. | .................... | 343/757 |
| 7,567,130 B2 * | 7/2009 | Neenan et al. | ............... | 330/308 |
| 2001/0044292 A1 * | 11/2001 | Jeon et al. | .................... | 455/334 |
| 2002/0132644 A1 * | 9/2002 | Mellor et al. | ............... | 455/562 |
| 2003/0090320 A1 * | 5/2003 | Skrobko et al. | ............. | 330/195 |
| 2005/0136876 A1 * | 6/2005 | Broholm | ..................... | 455/307 |
| 2005/0195038 A1 * | 9/2005 | Neenan et al. | ............... | 330/308 |
| 2005/0249504 A1 * | 11/2005 | O'Donnell et al. | .......... | 398/140 |
| 2006/0067254 A1 * | 3/2006 | Mahbub et al. | ............. | 370/282 |
| 2006/0267707 A1 * | 11/2006 | Tang et al. | ................... | 333/126 |

(Continued)

*Primary Examiner*—Minh D Dao
(74) *Attorney, Agent, or Firm*—Matthew J. Evans; Daniel M. Barbieri

(57) ABSTRACT

The present invention is a MEMS-based broadband transceiver/sensor.

A MEMS-based transceiver/sensor in accordance with the present invention may comprise: (a) an antenna; (b) a front-end triplexer block; (c) a plurality of N transceiving channels; and (d) an RF energy sensor. The front end triplexer block may comprise M triplexers, each triplexer having MEMS-based filters. The transceiving channels may each comprise: (i) a local oscillator; (ii) a mixer; (iii) a first N:1 MEMS-based switch; (iv) a plurality of N MEMS-based variable bandwidth bandpass filters; and (v) a second N:1 MEMS-based switch. The RF energy sensor may comprise: (vi) an M:1 MEMS-based switch; (vii) a local oscillator; (viii) a mixer; and (ix) a plurality of MEMS-based variable bandwidth bandpass filters.

15 Claims, 10 Drawing Sheets

U.S. PATENT DOCUMENTS

| | | | |
|---|---|---|---|
| 2007/0116465 A1* | 5/2007 | Bieker | 398/70 |
| 2008/0205897 A1* | 8/2008 | Neenan et al. | 398/136 |
| 2008/0298298 A1* | 12/2008 | Eom et al. | 370/316 |
| 2009/0231058 A1* | 9/2009 | Nishino et al. | 333/118 |
| 2009/0232008 A1* | 9/2009 | Wurst et al. | 370/245 |
| 2009/0279896 A1* | 11/2009 | Hufstedler et al. | 398/136 |
| 2009/0285579 A1* | 11/2009 | Neenan et al. | 398/136 |
| 2009/0286569 A1* | 11/2009 | Rousu et al. | 455/553.1 |

* cited by examiner

MEMS-BASED BROADBAND TRANSCEIVER/SENSOR

FIELD OF THE INVENTION

This invention relates generally to radio frequency (RF) transceiver/sensor systems, and, more specifically, to efficient broadband RF transceiver/sensor systems incorporating micro-electromechanical systems (MEMS) components.

BACKGROUND OF THE INVENTION

Radio/microwave frequency transceiving systems typically rely on superheterodyne architectures to couple high frequency signals from an antenna to a baseband processor. Such architectures typically have standard design features which may include antennas, amplifiers, mixers, oscillators and filters. With the ever-decreasing size of modern communications platforms, space for the circuitry footprints for these components is at a premium. However, previous methodologies for reducing the complexity of superheterodyne transceiving systems have achieved less than optimal results.

Direct conversion transceivers commonly suffer from energy leak from their local oscillators through the mixer to the antenna, thereby resulting in DC offset errors. Additionally, after a period of time, direct conversion transceivers may become unstable due to frequency drift of the local oscillator.

In superheterodyne systems, all signal frequencies are typically converted to a constant intermediate frequency (IF). As such, filters are heavily relied upon to channelize bands of operation and reject interference. Filters typically comprise a large portion of the overall volume of a device. Also, current filters are not amenable to monolithic fabrication and require costly touch labor as they are manufactured from multiple distinct components. Surface acoustic wave (SAW) filters are inherently narrow-band, lossy, have poor group delay response, and are not amenable to monolithic integration. Varactor-based filters typically have high losses, modest intermodulation performance, limited tuning ranges and complex biasing requirements.

Efficient radios architectures also rely on highly linear, low loss switches to select between channels. However, many common switching mechanisms may have high insertion losses, and isolation and linearity characteristics which are less than optimal. Field effect transistor (FET) based semiconductor switches are lossy, exhibit poor isolation, and are prone to intermodulation.

As a result, the demand for ever more flexible, sophisticated, lightweight and low-power transceiver/sensor systems has resulted in the emergence of micro-electromechanical systems (MEMS) technologies. MEMS are the integration of mechanical elements, sensors, actuators, and electronics on a common silicon substrate through microfabrication technology. While the electronics are fabricated using integrated circuit process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices. A brief summary of current MEMS technology and future MEMS development potential may be found in "MEMS for RF/Microwave Wireless Applications: The Next Wave" by Randy J. Richards and Hector J. De Los Santos, *Microwave Journal, March* 2001 & July 2001, herein incorporated by reference.

MEMS technologies are reaching a point of maturity where filter resonators and switches can be fabricated monolithically and in high density while retaining performance characteristics approaching traditional filter technologies.

Therefore, it would be desirable to provide a MEMS-based broadband transceiver and sensor system.

SUMMARY OF THE INVENTION

Accordingly, the present invention is directed to a MEMS-based broadband transceiver/sensor system.

In an embodiment of the invention a broadband transceiver may comprise: (i) a MEMS-based triplexer; (ii) a local oscillator; (iii) a mixer; (iv) a first N:1 MEMS-based switch; (v) a plurality of N MEMS-based variable bandwidth bandpass filters; and (vi) a second N:1 MEMS-based switch.

In a further embodiment of the inventions, an RF energy sensor may comprise: (a) a plurality of M MEMS-based triplexers; (b) an M:1 MEMS-based switch; (c) a local oscillator; (d) a mixer; (e) a surface acoustic wave (SAW) filter; (f) an amplifier; and (g) an array of MEMS-based filters.

In still a further embodiment of the invention, a MEMS-based transceiver/sensor system may comprise: (a) an antenna; (b) a front-end triplexer block; (c) a plurality of transceiving channels; and (d) an RF energy sensor.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
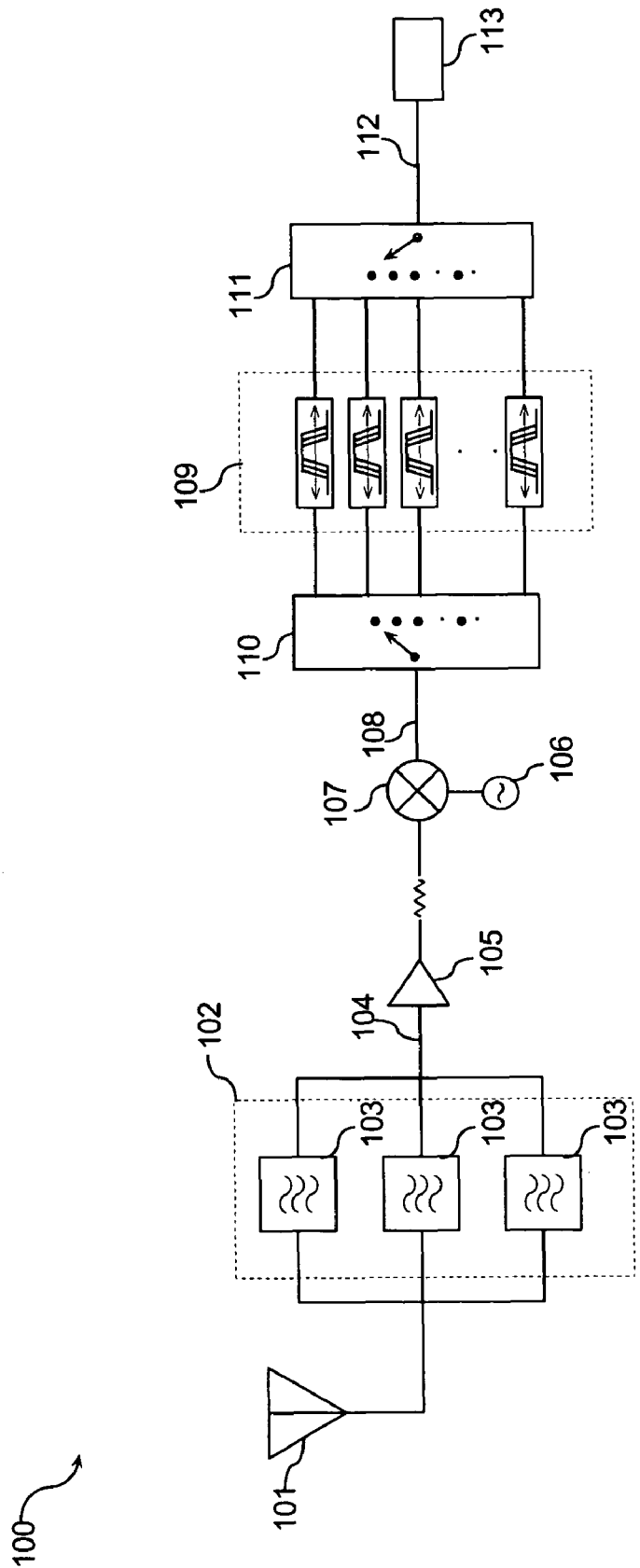
FIG. 1 depicts a circuit diagram of a MEMS-based transceiver element in accordance with an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Reference will now be made, in detail, to presently preferred embodiments of the invention. Additional details of the invention are provided in the examples illustrated in the accompanying drawings.

Referring to FIG. 1, a circuit diagram of a MEMS-based broadband transceiver 100 in accordance with an embodiment of the present invention is disclosed. The transceiver 100 may include an antenna 101 structure for the receipt of RF and microwave signals. The signals may be passed to a triplexer filter block 102 comprising a plurality of MEMS-based filters 103.

The topology of each filter 103 may be a bandpass structure. Filter constructions for the MEMS-based filters 103 may vary according to desired operational frequencies.

Figure 4:
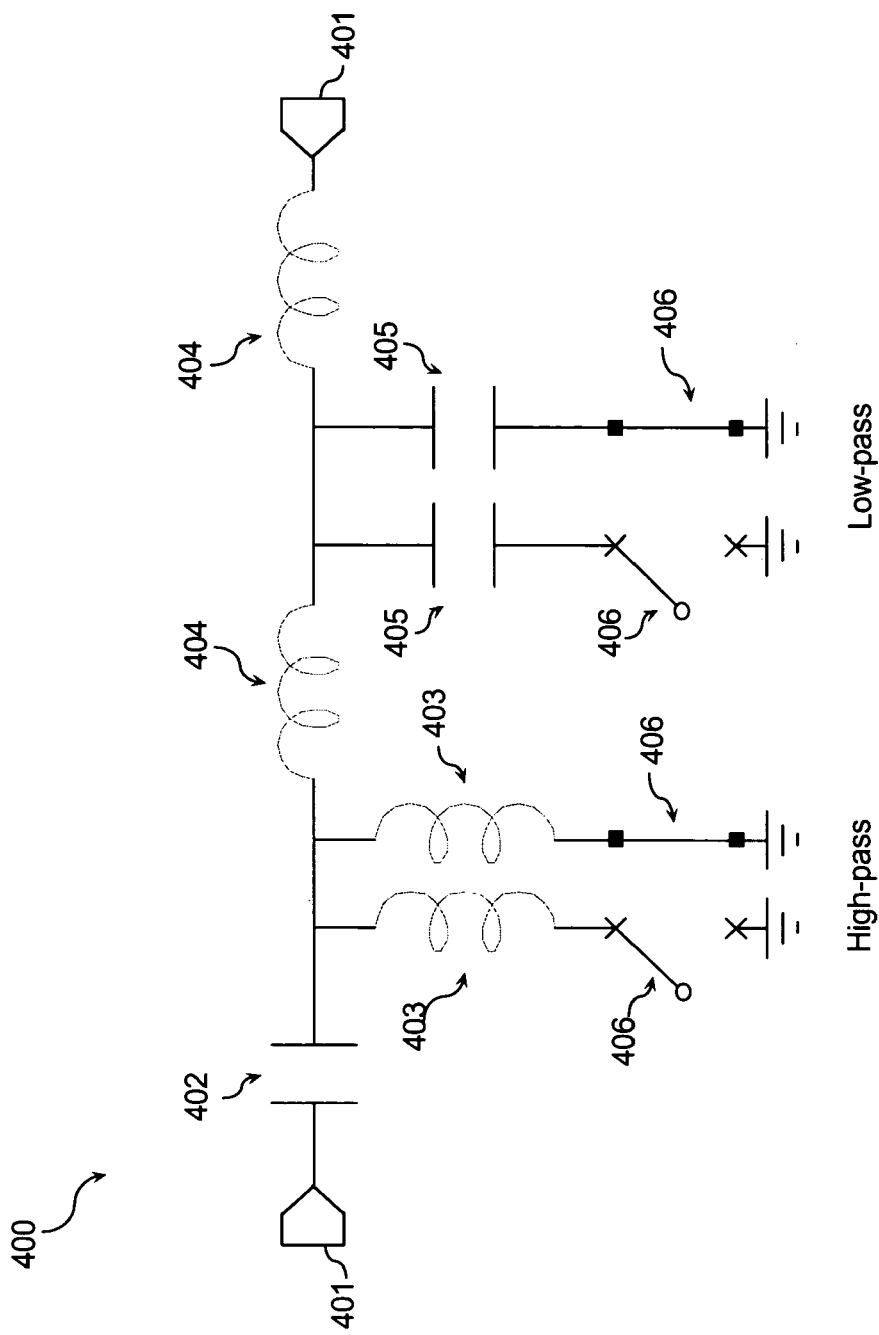
FIG. 4 depicts a low-frequency, MEMS-based filter in accordance with an embodiment of the present invention.

At low frequencies (20-145 MHz), commercial-of-the-shelf (COTS) high-Q lumped inductors and capacitors may be used in combination with MEMS switches to create a high pass/low pass, tunable, fixed-frequency topology. Referring to FIG. 4, a low-frequency filter 400 schematic is presented. The filter 400 may comprise input/output ports 401. A high-pass capacitor 402 may have a capacitance of from 27 to 159 pF. High-pass inductors 403 may have an inductance of from 33 to 200 nH. Low-pass inductors 404 may have an inductance of from 55 to 177 nH. Low-pass capacitors 405 may have a capacitance of from 44 to 141 pF. MEMS switches 406 may be used to tune the low-frequency filter.

Figure 5:
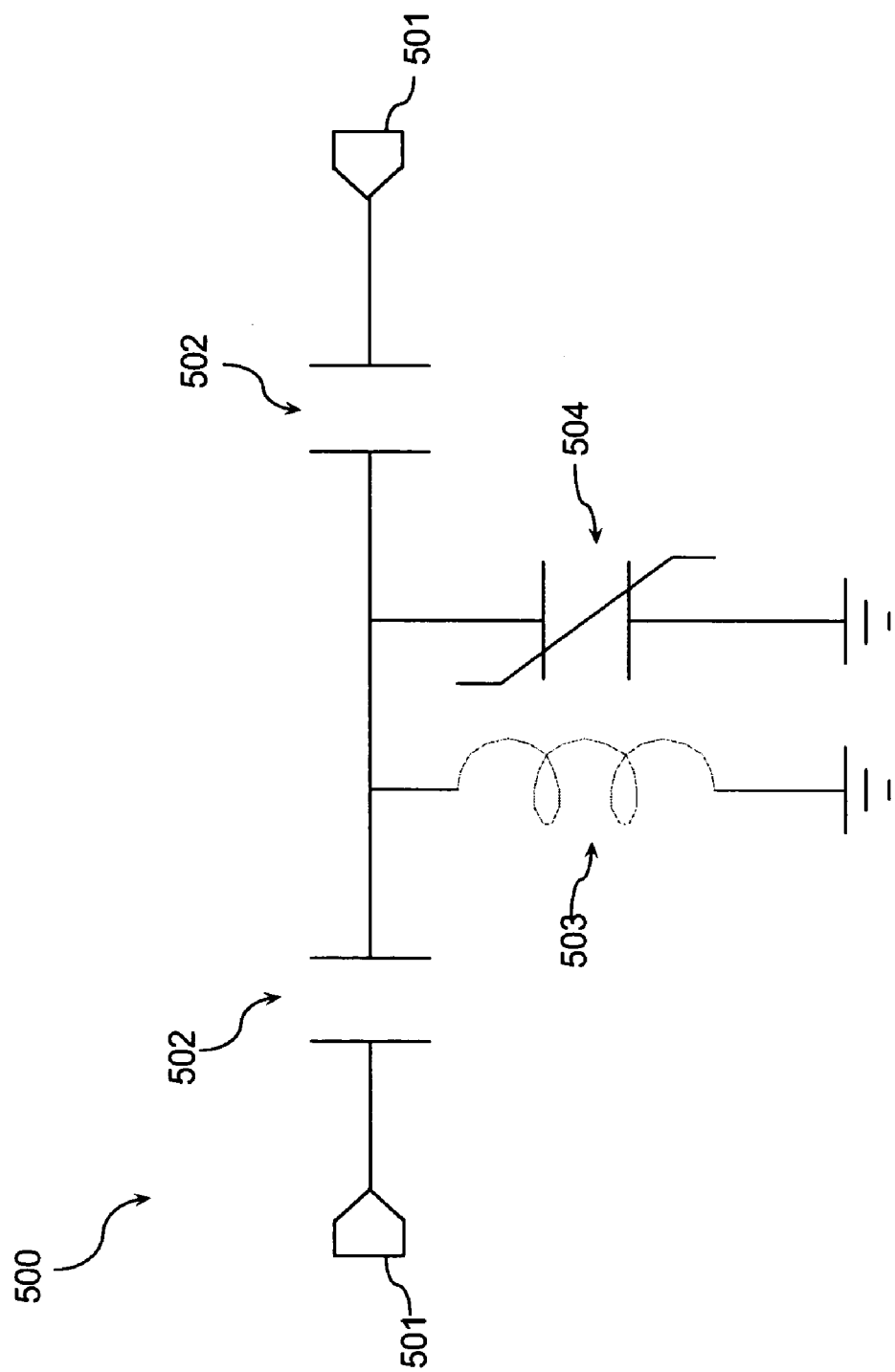
FIG. 5 depicts a moderate-frequency, MEMS-based filter in accordance with an embodiment of the present invention.
Figure 8:
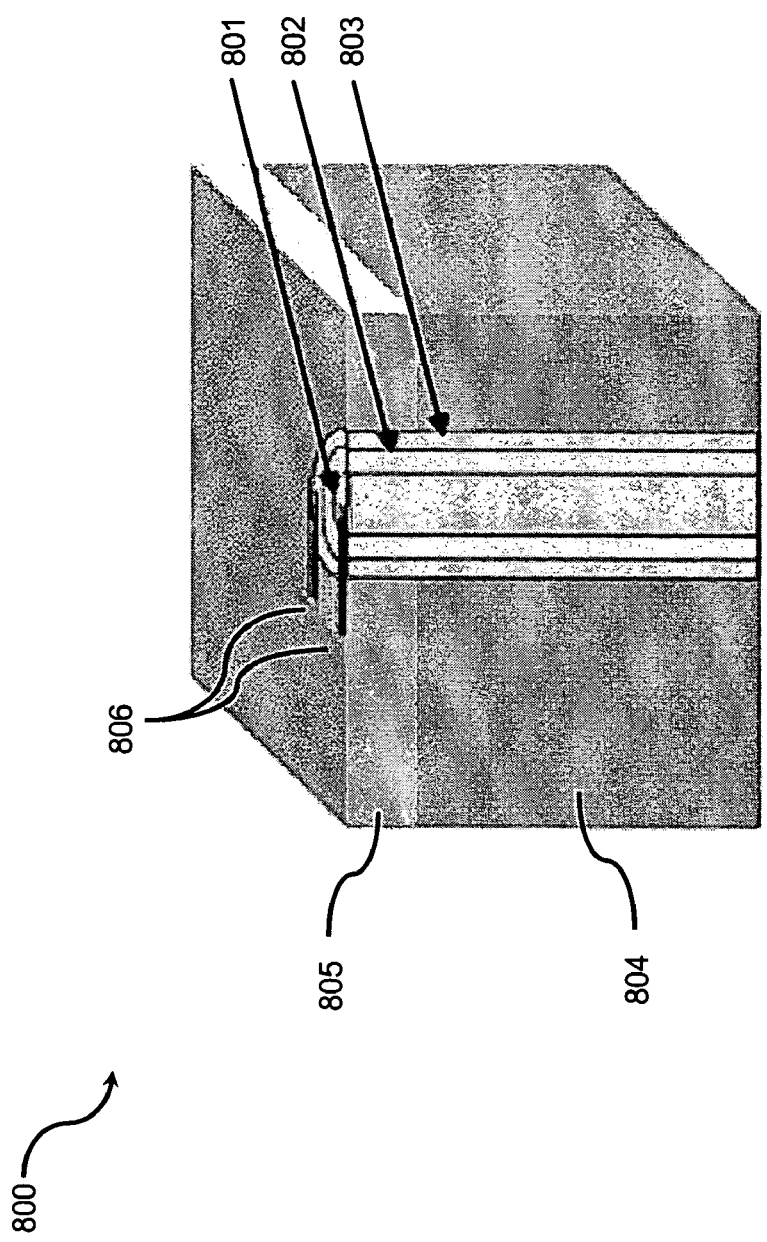
FIG. 8 depicts a vertical capacitor in accordance with an embodiment of the present invention.

At medium frequencies (145-1200 MHz), a single COTS lumped inductor is resonated with MEMS based vertical capacitors (VCaps). Referring to FIG. 5, a mid-frequency filter 500 schematic is presented. The filter 500 may comprise input/output ports 501. Coupling capacitors 502 may have a capacitance of from 1.2 to 113 pF. A tank inductor 503 may have an inductance of from 2 to 10 nH. Referring to FIG. 8, a VCap 800 is presented. A MEMS-based VCap 800 may have a first capacitive layer 801, an insulating layer 802 and a second capacitive layer 803. The capacitive layers 801 and 803 and the insulating layer 802 may be disposed within a silicon substrate layer 804 and an active electronics layer 805. The capacitive layers 801 and 803 may be operable coupled to a circuit disposed on the active electronics layer 805 by ports 806.

Figure 6A:
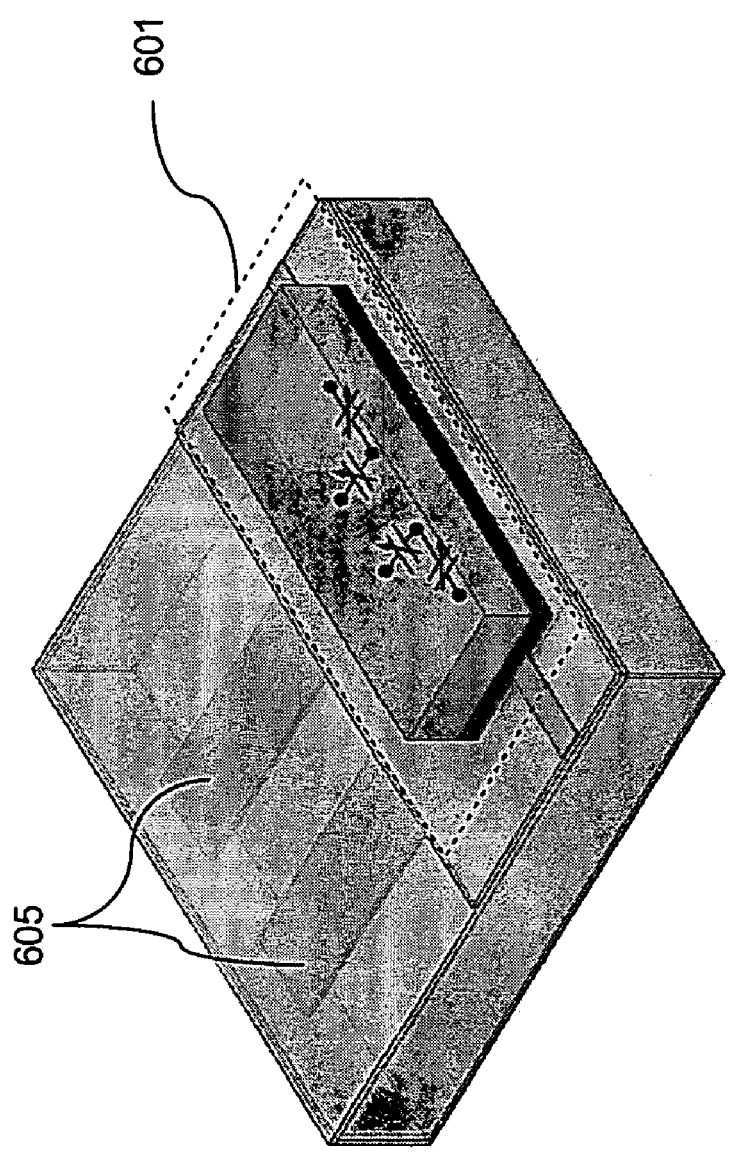
FIGS. 6a and 6b depict a high-frequency, MEMS based filter in accordance with an embodiment of the present invention.
Figure 6B:
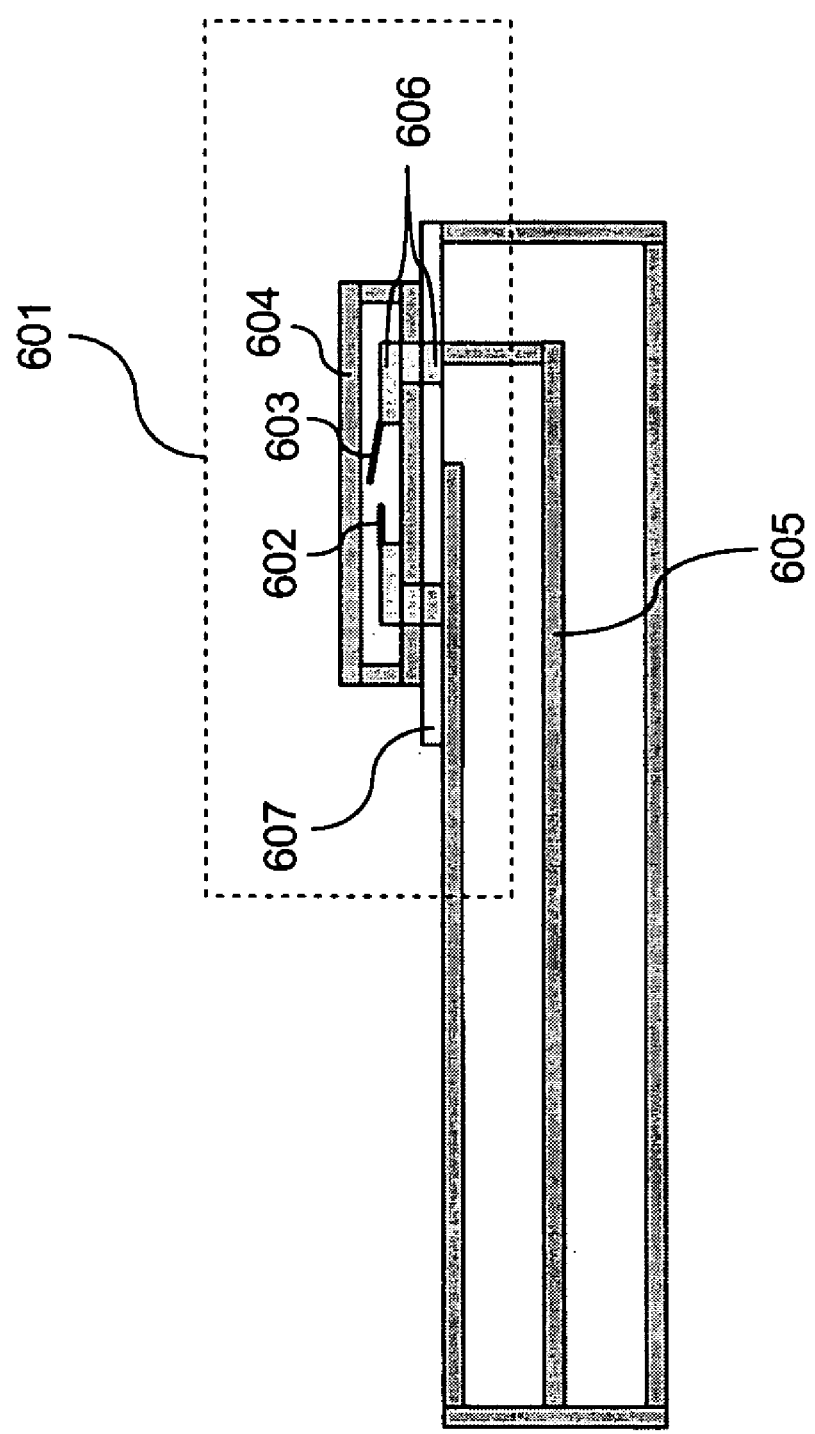

At high frequencies (1200-6000 MHz), a cavity-isolated, constant bandwidth, tunable filter may be incorporated. A tunable comb-line structure is resonated with MEMS-based capacitors and switches. Referring to FIGS. 6a and 6b, axonometric and cross-sectional views of an embodiment of a high-frequency filter are presented. The high-frequency filter may comprise a packaged MEMS chip 601 disposed substantially adjacent to a resonator structure 605. The MEMS chip 601 may further comprise MEMS capacitor having a fixed plate 602 and a moveable plate 603 disposed with in a shielding structure 604. The movable plate 603 may be operably coupled to the resonating structure 605 via electrical connections 606. In a further embodiment of the invention, the high-frequency filter may comprise a tunable comb-line structure that is resonated with MEMS-based capacitors and switches.

The individual MEMS-based filters 103 within the triplexer filter block 102 are sufficiently separated in frequency to prevent degradation in the performance of each individual filter response. In further embodiments of the present invention, the center frequencies of the each of the MEMS-based filters 103a, 103b, and 103c may be:

a) 17-26 MHz, 131-195 MHz, and 0.989-1.481 GHz;
b) 27-39 MHz, 196-293 MHz, and 1.482-2.222 GHz;
c) 40-58 MHz, 294-440 MHz, and 2.223-3.334 GHz;
d) 59-87 MHz, 441-659 MHz, and 3.335-5.000 GHz; or
e) 88-130 MHz, 670-988 MHz, and 5.001-7.500 GHz, respectively.

In still a further embodiment, the center frequencies of each of the MEMS-based filters 103a, 103b, and 103c may be:

a) 20 MHz, 156 MHz, and 1.185 GHz;
b) 31 MHz, 234 MHz, and 1.777 GHz;
c) 46 MHz, 351 MHz, and 2667 GHz;
d) 69 MHz, 526 MHz, and 4.000 GHz; or
e) 104 MHz, 790 MHz, and 6.000 GHz, respectively.

This frequency separation permits the outputs of the three filters 103 to be recombined into a single signal 104 thereby eliminating the need for input and output multiplexing MEMS switches. The recombination also allows for the use of a single broadband, low noise amplifier 105 so as to reduce overall power dissipation.

Referring again to FIG. 1, the receiver 100 may also include a local oscillator 106 and a mixer 107 to mix the filtered frequencies 104 to an intermediate frequency (IF) signal 108. In an embodiment of the invention, the IF signal 108 may be approximately 500 MHz.

Figure 7A:
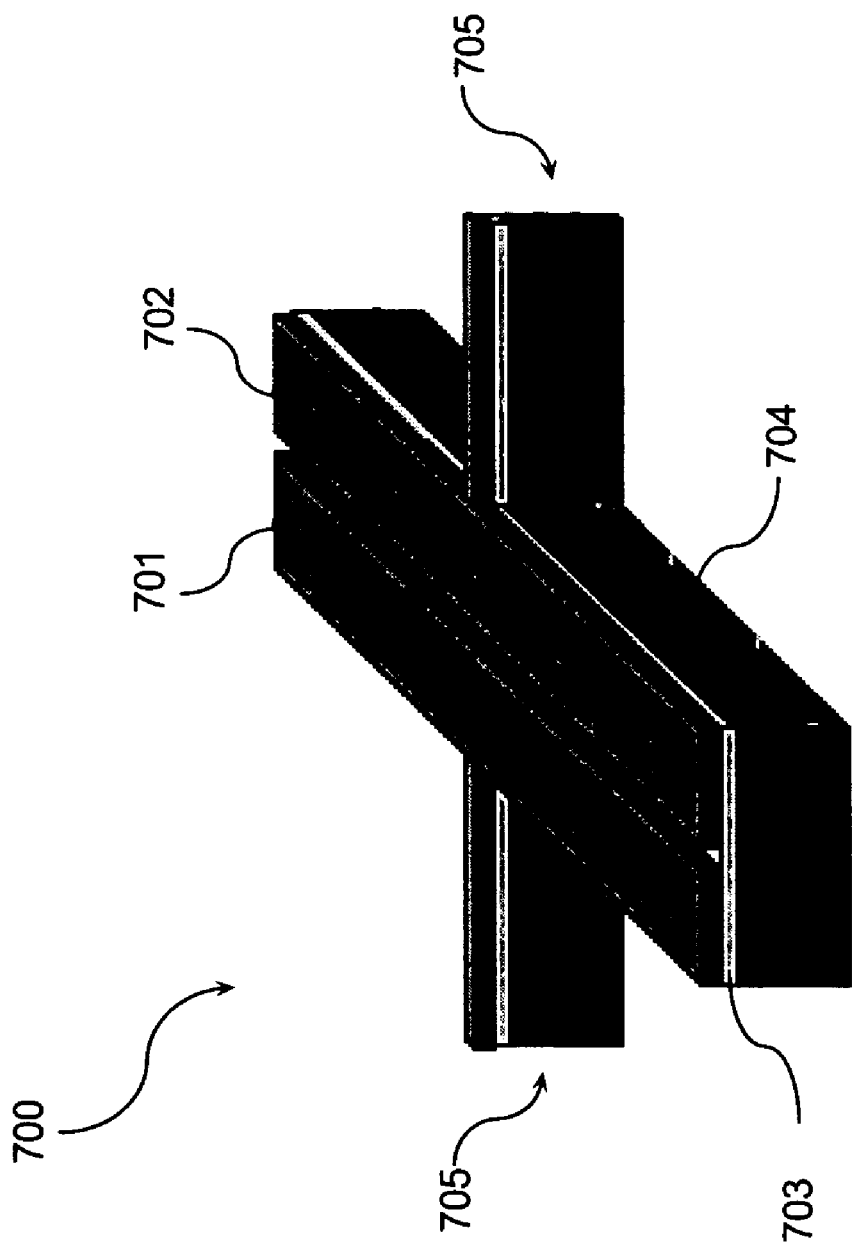
FIG. 7a depicts a dielectrically transduced MEMS resonator in accordance with an embodiment of the present invention.
Figure 7B:
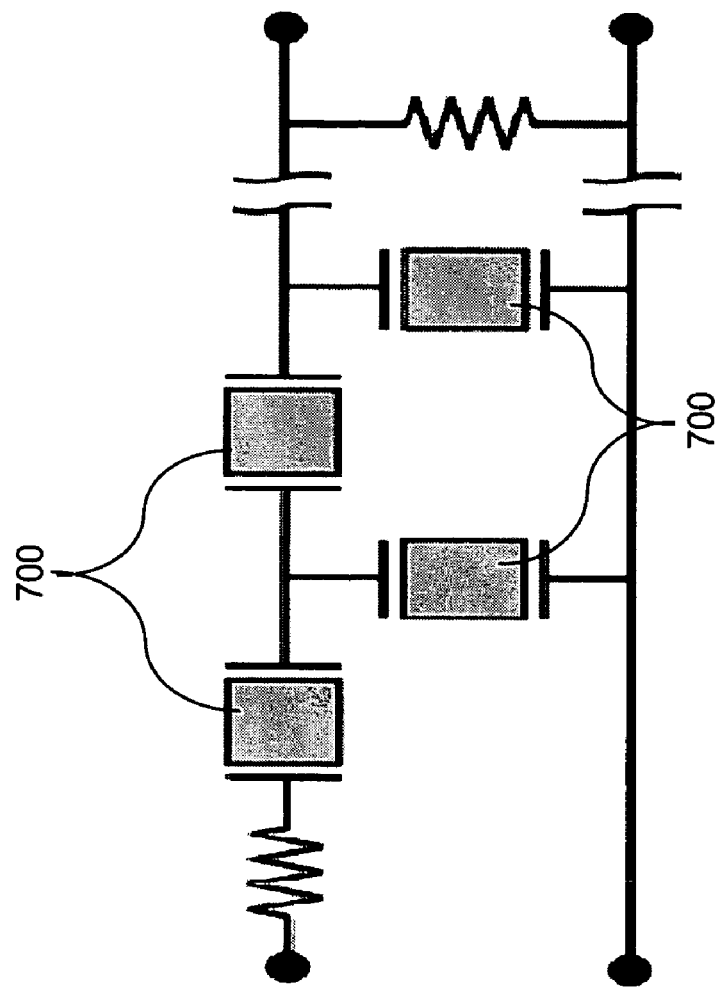
FIG. 7b depicts a circuit schematic for a MEMS-based variable IF filter comprising dielectrically transduced MEMS resonators in a ladder/lattice configuration in accordance with an embodiment of the present invention.

The IF signal 108 may then be routed through one of N variable-bandwidth MEMS filters in an IF filter array 109. The individual variable bandwidth filters of the MEMS filter array 109 may be configured to further separate incremental segments of the IF 108. Each variable bandwidth filter may be configured such that each filter accounts for an equal portion of the IF range. In an embodiment of the invention, each of five filters in the filter array 109 may have a bandwidth of 5 MHz wide to cover a total of 25 MHz. The MEMS-based variable IF filters of the MEMS filter array 109 may comprise dielectrically transduced, silicon-thickness, shear mode, bar resonators in a ladder configuration. This filter structure provides both variable bandwidth and center frequency (over a limited range). Referring to FIG. 7a, an axonometric view of a dielectrically transduced MEMS resonator 700 is presented. The dielectrically transduced MEMS resonator 700 may comprise a sense electrode 701 and a drive electrode 702. The electrodes 701 and 702 may be disposed substantially adjacent to a dielectric layer 703. The dielectric layer 703 may have a silicon substrate support layer 704. The filter 700 may further comprise suspension beams 705. Referring to FIG. 7b, a circuit schematic for a MEMS-based variable IF filter of the MEMS filter array 109 is presented. Dielectrically transduced MEMS resonators 700 may be arranged in a ladder/lattice configuration as shown.

In still a further embodiment of the invention, the MEMS filters of the triplexer 102 and the filter array 109 may comprise MEMS mechanical resonators in combination with analog amplifiers. The MEMS resonators may be selected from the group comprising vertical displacement resonators and film bulk acoustic wave resonators, depending on resonance frequency, selectivity, and Q requirements.

The IF signal 108 may be routed to a specific variable bandwidth MEMS filter in the IF filter block 109 using a first N:1 MEMS switch 110 and a second N:1 MEMS switch 111. In a further embodiment of the invention N is equal to five (5). The MEMS switches in MEMS switch blocks 110 and 111 may have insertion losses of less than 0.25 dB and a lifetime of from 50 billion to 100 billion cycles. Such switches include the SPST brand of switches manufactured by Radant MEMS. The MEMS switches 110 and 111 may be selected from cantilever, membrane, shape-memory alloy, and multi-pole/multi-throw-type switches. The actuation mechanisms for these switch-types may include electrostatic, piezoelectric, thermal, magnetic, and bi-metallic mechanisms. Possible contact mechanisms for the MEMS switch may include metal-to-metal contact and capacitively-coupled switches.

The output frequency 112 from the MEMS filter array 109 may be directed to an analog-to-digital converter (ADC) 113 for further signal processing.

Figure 2:
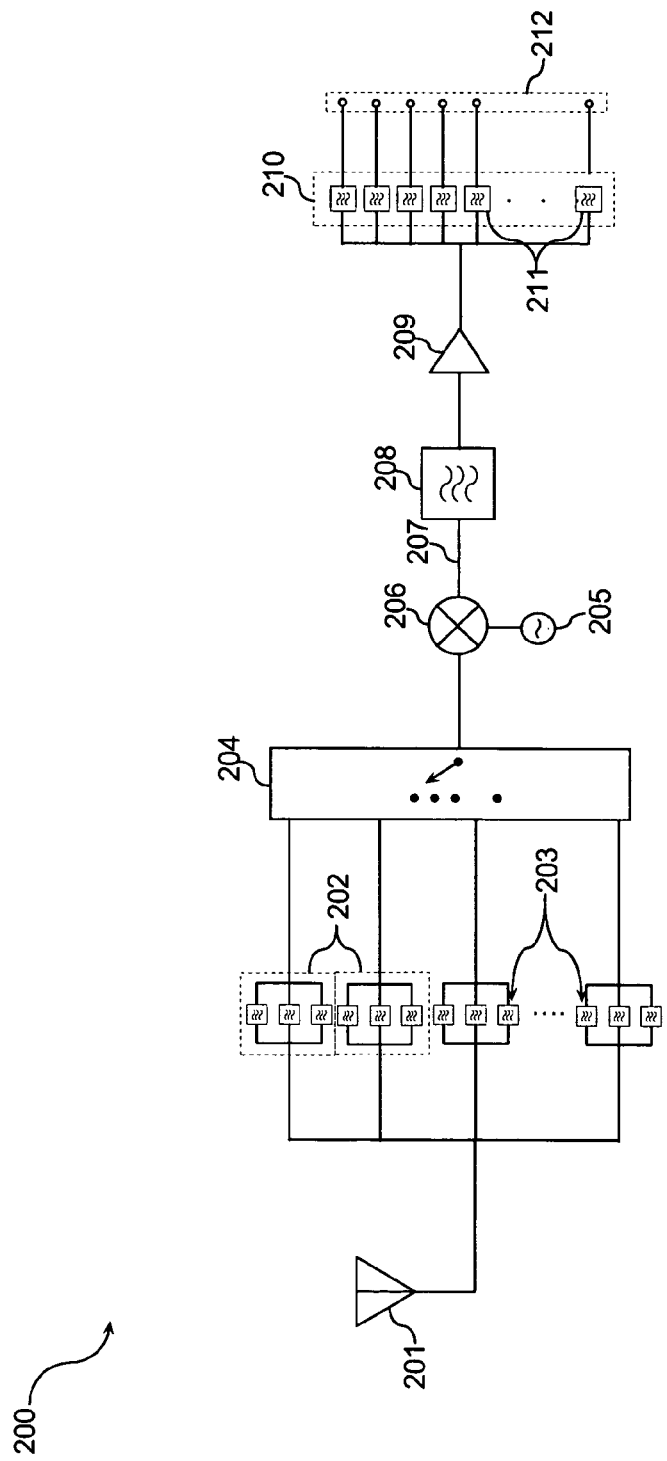
FIG. 2 depicts a circuit diagram of a MEMS-based RF energy sensor element in accordance with an embodiment of the present invention.

Referring to FIG. 2, a circuit diagram of a MEMS-based broadband RF energy sensor 200 in accordance with an embodiment of the present invention is disclosed. The sensor 200 may include an antenna 201 structure for the receipt of RF and microwave signals. The signals may be passed to an array of M triplexers 202, each triplexer 202 comprising a plurality of MEMS-based filters 203. The individual MEMS-based filters 203 comprising a triplexers 202 are sufficiently separated in frequency to prevent degradation in the performance of each individual filter response. In a further embodiment of the present invention, the center frequencies of the respective MEMS-based filters 203 in a five-triplexer 202 array may be:

a) 17-26 MHz, 131-195 MHz, and 0.989-1.481 GHz;
b) 27-39 MHz, 196-293 MHz, and 1.482-2.222 GHz;
c) 40-58 MHz, 294-440 MHz, and 2.223-3.334 GHz;
d) 59-87 MHz, 441-659 MHz, and 3.335-5.000 GHz; and
e) 88-130 MHz, 670-988 MHz, and 5.001-7.500 GHz, respectively.

In still a further embodiment, the center frequencies of the respective MEMS-based filters 203 of each triplexer 202 in a five-triplexer array may be:

a) 20 MHz, 156 MHz, and 1.185 GHz;
b) 31 MHz, 234 MHz, and 1.777 GHz;
c) 46 MHz, 351 MHz, and 2667 GHz;
d) 69 MHz, 526 MHz, and 4.000 GHz; and
e) 104 MHz, 790 MHz, and 6.000 GHz, respectively.

The topology of each filter of the triplexers 203 may be a bandpass structure. At low frequencies (20-145 MHz), commercial-of-the-shelf (COTS) lumped inductors and capacitors may be used in a high pass/low pass, fixed frequency topology as presented in FIG. 4. At medium frequencies (145-1200 MHz), a single COTS lumped inductor is resonated with MEMS-based vertical capacitors (VCaps) as presented in FIGS. 5 and 8. At high frequencies (1200-6000 MHz), a cavity-isolated, constant bandwidth filter may be incorporated where a tunable, comb-line structure is resonated with MEMS-based capacitors and switches as presented in FIG. 6.

The respective signals from each of the M triplexers 202 may be routed to an MEMS-based M:1 switch 204. The MEMS switch 204 may be capable of selecting a particular triplexer 202 signal for further processing. In a further embodiment of the invention, M is equal to five (5). The MEMS switch 204 may have insertion losses of less than 0.25 dB and a lifetime of from 50 billion to 100 billion cycles. Such switches include the SPST brand of switches manufactured by Radant MEMS. The MEMS switch 204 may be selected from cantilever, membrane, shape-memory alloy, and multi-pole/multi-throw-type switches. The actuation mechanisms for these switch-types may include electrostatic, piezoelectric, thermal, magnetic, and bi-metallic mechanisms. Possible contact mechanisms for the MEMS switch may include metal-to-metal contact and capacitively-coupled switches.

The sensor 200 may also include a local oscillator 205 and a mixer 206 to mix the filtered frequencies 104 to a desired intermediate frequency (IF) signal 207. The IF signal 207 may be routed to a secondary filter 208. The secondary filter 208 may be a SAW or MEMS-based filter. The output of the secondary filter 208 may, in turn, be routed to a broadband, low-noise amplifier 209 for further signal enhancement.

The output of the amplifier 209 may be routed to an array 210 of MEMS-based filters 211. Each of the MEMS filters 211 in the filter array 210 may be configured so as to segregate a specific portion of the overall IF signal 207 frequency range for the signal received by the antenna 201. As such, the filter array 210 may be used to conduct frequency dependent amplitude detection via filter outputs 212. The filter outputs 212 may be routed to a series of analog-to-digital controllers (not shown) for further signal processing. In an embodiment of the invention, the frequency range for the signal received by the antenna 201 is between 20 MHz and 6.0 GHz.

The MEMS-based variable IF filters 211 of the filter array 210 may comprise dielectrically transduced silicon thickness shear mode bar resonators in a ladder configuration as presented in FIGS. 7a and 7b. This variable filter structure provides both variable bandwidth and center frequency (over a limited range).

In a further embodiment of the invention, the MEMS filters 211 of the filter array 210 may comprise MEMS mechanical resonators in combination with analog amplifiers. The MEMS resonators may be selected from the group comprising vertical displacement resonators and film bulk acoustic wave resonators, depending on resonance frequency, selectivity, and Q requirements.

Figure 3:
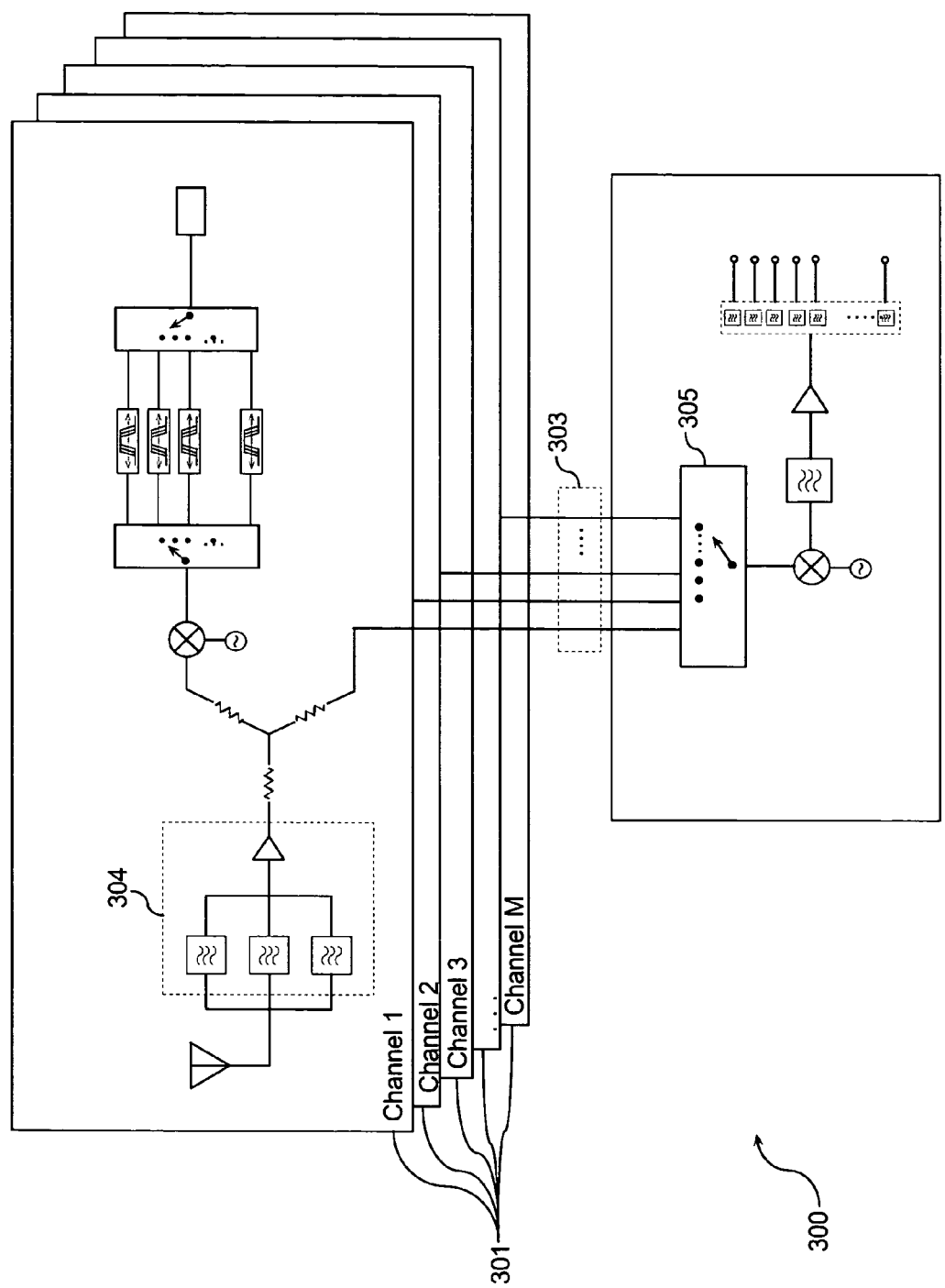
FIG. 3 depicts a circuit diagram for a combined MEMS-based transceiver/RF energy sensor in accordance with an embodiment of the present invention.

Referring to FIG. 3, a MEMS-based broadband transceiver/sensor 300 in accordance with an embodiment of the present invention is disclosed. The transceiver/sensor 300 may comprise a plurality of M MEMS-based transceiving channels 301 (as detailed above in reference to FIG. 1) and a MEMS-based RF energy sensor 302 (as detailed above in reference to FIG. 2).

The output 303 from the triplexer 304 of each of the M transceiving channels 301 may be routed to a MEMS-based M:1 switch 305 of the RF energy sensor 302. Such a configuration eliminates the need for duplicate triplexer blocks for the transceiving channels 301 and the RF energy sensor 302 thereby further reducing the complexity of a transceiver/sensor 300 system.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for transceiving and sensing radio frequency (RF) signals, the system comprising:
   an antenna;
   a front-end triplexer block comprising M triplexers;
   M transceiving channels; and one or more RF energy sensors, wherein one or more of the M triplexers comprises one or more MEMS-based filters.

2. The system of claim 1, wherein the one or more MEMS-based are selected from the group comprising:
lumped inductors and capacitors in a high pass/low pass variable frequency topology;
a single lumped inductor in combination with a MEMS-based vertical capacitor; and
a tunable comb-line structure in combination with MEMS-based capacitors and switches.

3. The system of claim 1, wherein one or more of the M transceiving channels comprises:
a local oscillator;
a mixer;
a first N:1 MEMS-based switch;
N MEMS-based variable bandwidth bandpass filters; and
a second N:1 MEMS-based switch.

4. The system of claim 3, wherein the first and second MEMS-based switches have insertion losses of less than or equal to 0.25 dB.

5. The system of claim 3, wherein the first and second N:1 MEMS-based switches are selected from the group comprising:
cantilever, membrane, shape-memory alloy, and multi-pole/multi-throw-type switches.

6. The system of claim 1, wherein one or more of the M transceiving channels comprises:
N MEMS-based variable bandwidth bandpass filters.

7. The system of claim 6, wherein one or more of the N MEMS-based variable bandwidth bandpass filters comprises:
two or more dielectrically transduced, silicon thickness, shear mode, bar resonators in a ladder configuration.

8. The system of claim 1, wherein the one or more RF energy sensors comprise:
an M:1 MEMS-based switch;
a local oscillator;
a mixer; and
N MEMS-based variable bandwidth bandpass filters.

9. The system of claim 8, wherein one or more RF energy sensors further comprise:
a secondary filter, wherein the secondary filter is a surface acoustic wave filter.

10. The system of claim 8, further comprising:
a low noise amplifier.

11. The system of claim 8, further comprising:
one or more analog-to-digital converters operably coupled to one or more outputs of the N MEMS-based variable bandwidth bandpass filters.

12. The system of claim 1, wherein an output of each triplexer of the M triplexers is routed to a transceiving channel of the M transceiving channels, and wherein the output of each triplexer of the M triplexers is routed to an M:1 MEMS-based switch of a single RF energy sensor.

13. The system of claim 1, wherein one or more of the M transceiving channels comprises:
an analog-to-digital signal converter.

14. A method comprising:
receiving RF signals;
providing the RF signals to a front-end triplexer block comprising M triplexers;
providing the output of a triplexer of the front-end triplexer block to a transceiving channel;
providing an output of each triplexer of the M triplexers of the front-end triplexer block to an RF energy sensor,
wherein one or more of the M triplexers comprises one or more MEMS-based filters.

15. A system comprising:
circuitry for receiving RF signals;
circuitry for providing the RF signals to a front-end triplexer block comprising M triplexers;
circuitry for providing the output of a triplexer of the front-end triplexer block to a transceiving channel;
circuitry for providing an output of each triplexer of the M triplexers of the front-end triplexer block to an RF energy sensor,
wherein one or more of the M triplexers comprises one or more MEMS-based filters.

* * * * *